C. DIETZ & E. GOFFERJE.
PROCESS FOR CRUSHING OR PULVERIZING MATERIALS.
APPLICATION FILED MAY 16, 1910.

1,074,847.

Patented Oct. 7, 1913.

Witnesses:

Inventors:

UNITED STATES PATENT OFFICE.

CARL DIETZ AND EMIL GOFFERJE, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS FOR CRUSHING OR PULVERIZING MATERIALS.

1,074,847.      Specification of Letters Patent.      Patented Oct. 7, 1913.

Application filed May 16, 1910. Serial No. 561,716.

*To all whom it may concern:*

Be it known that we, CARL DIETZ and EMIL GOFFERJE, citizens of the German Empire, residing at Leverkusen, near Cologne, Germany, have invented new and useful Improvements in Processes for Crushing or Pulverizing Materials, of which the following is a specification.

Our invention relates to new and useful improvements in a process for crushing or pulverizing materials, and is particularly designed for the treatment of roasted or heated materials which are more readily frangible while hot.

In the crushing or pulverization of chemical products such as sulfate, soda, roasted ores, burned lime, chromates and the like which are obtained by long heating in furnaces are usually removed from the furnace while hot, and even at a red heat, the course heretofore has generally been to transport them to a suitable place to cool before they can be pulverized. This method is especially disadvantageous for the reason that some materials which are very easy to pulverize when highly heated after cooling set in large masses and become so hard that it is extremely difficult to grind them without much labor and loss of time. It has also been found that when subjecting the materials to the air for cooling they become decomposed, which is particularly true of sulfate of sodium.

It is therefore our object to overcome the disadvantages encountered in the known methods of procedure, which object we accomplish by taking the roasted chemical product at substantially its roasting heat and gradually cooling the same from its roasting temperature and during the cooling subjecting it to crushing or disintegration while the process of crushing and disintegration can be more easily effected.

The invention consists in the process to be fully described hereinafter and the novelty of which will be particularly pointed out and distinctly claimed.

Figure 1:
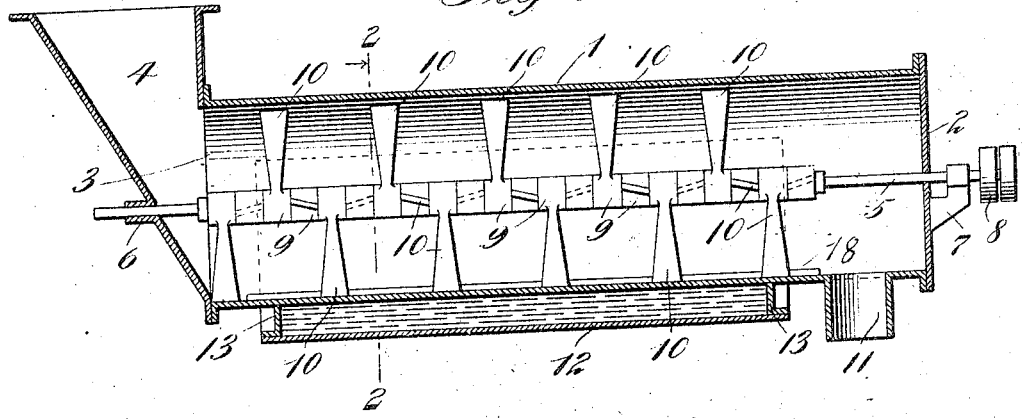
Figure 2:
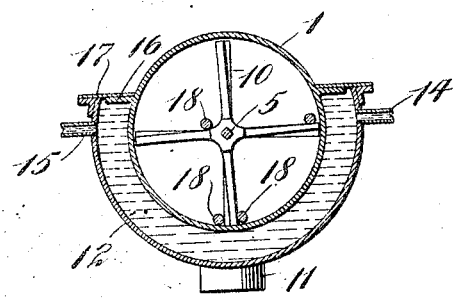
Figure 3:
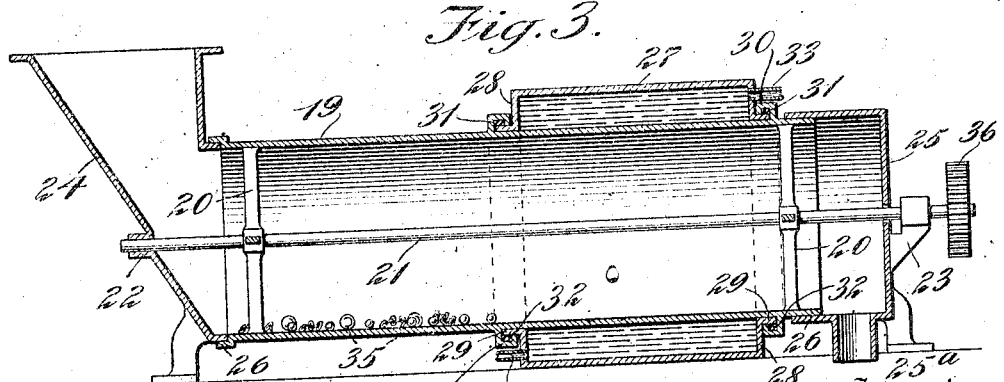

We have fully and clearly illustrated two forms of apparatus for carrying the invention into effect in the accompanying drawings to be taken as a part of this specification and wherein:

Figure 1 is a longitudinal, vertical, central section through one form of apparatus for practising our invention. Fig. 2 is a section on the line 2—2 of Fig. 1. Fig. 3 is a longitudinal, vertical, central section through another apparatus for practising our invention.

Referring to the drawings by characters of reference, and particularly to Fig. 1: 1 designates a casing in which the pulverization and the cooling of the roasted materials take place, said casing consisting of a horizontally disposed cylindrical shell having one end closed by a wall 2 and the opposite end open, as shown at 3, the open end being provided with a feed hopper 4 through which the materials to be treated are fed to the casing. Any suitable means may be provided for crushing or pulverizing the material after they are inserted within the casing, said means, as shown in Fig. 1, preferably consisting of rotary beaters or blades which strike the material and thereby break the large masses thereof into small particles. This crushing or pulverizing means more specifically consists of a shaft 5 extending longitudinally of the shell 1 within the same, and co-incident with the longitudinal axis thereof, said shaft having bearings at 6—7 on the hopper and end wall respectively, and said shaft being provided with suitable driving pulleys 8 for connection with a source of power. Mounted upon this shaft 5 and fixed thereto is a plurality of collars 9, each of which is provided with a radially extending blade 10, the free end of which terminates closely adjacent the inner surface of the shell. These ends are preferably so formed that, when rotated, they will serve not only to crush or break up the material being treated, but will also serve to move the same from the feed hopper longitudinally of the shell toward a discharge opening 11 at the end of the shell opposite the feed hopper. In order to move the material longitudinally of the shell the striking faces of the blades are inclined rearwardly from their forward edges toward their rear edges so that said faces in striking the material move the same before them. We do not desire to be limited to any specific means for causing the material to move lengthwise of the cylinder, nor do we limit ourselves to so constructing the arms 10 as to accomplish this purpose, as other means may be employed for this purpose.

We provide means in connection with the shell 1 for cooling the roasted materials while they are being crushed or broken up, and in Figs. 1 and 2 this means consists of an exterior shell 12 which may surround the bottom portion of the shell 1, and is spaced therefrom, the ends of the spaces being closed by end plates 13 so that a closed chamber is provided about the shell 1, which chamber is adapted to receive cooling material for the purpose of lowering the temperature of shell 1 and its contents, such, for instance, as water, which may be circulated continuously through the chamber, if desired, inlet and outlet pipes 14 and 15 being shown for this purpose.

Any suitable means may be employed for closing the space between the upper edges of the shell 12 and the shell 1, said means preferably consisting of a flange 16 on the shell 1 upon which rests a closure plate 17 projecting over the edge of the shell 12, said plate being secured to said shell and flange by any suitable means.

As additional means for assuring the proper crushing or breaking up for the material, we may provide within the cylinder longitudinally extending loose bars 18 which are thrown around by the arms 10 during the rotation of the latter.

In Fig. 3 we have shown another means for practising the invention, in which the cylinder is arranged to revolve, and the water jacket is held stationary, the cylinder revolving within the same. In this form of the apparatus the cylinder is shown at 19, being connected by internal bars 20 at its opposite ends to a rotary shaft 21, which shaft is arranged to rotate in bearings 22, 23 in the hopper 24 and an end portion 25, said hopper and end portion being maintained stationary and the cylinder arranged to revolve relative thereto, suitable lap joints 26 being provided between the parts to prevent escape of the material being treated. The outlet for the material from the shell 19 is shown at 25ª. In this form of the apparatus for practising the process the cooling chamber completely surrounds the shell and consists of a cylindrical body 27 of a diameter such that the wall thereof is spaced from the wall of the casing, said cylindrical body having inwardly directed end flanges 28 provided with annular flanges 29 extending at right-angles thereto and engaging the outer surface of the shell 19. The shell 19 is provided with over-hanging flanges 30 which extend over the said flanges 29 and each of which is formed with an annular recess 31 to receive a suitable packing 32 to make a fluid-tight joint between said cylindrical body and the shell 19. The chamber formed by the shell 19 and the cylindrical body 27 may be provided with inlet and outlet ports 33—34 by means of which a flow of fluid may be maintained through the chamber. Any suitable means may be provided within the chamber for breaking up the material being treated, such, for instance, as loose elements such as balls, chains, and the like, shown generally at 35.

It is thought that the method of procedure in practising the invention will be apparent to those skilled in the art but it might be briefly stated, referring to Fig. 1, that the material is preferably discharged from the furnace, while in a highly heated condition, directly into the hopper 4 where it is engaged by the rotary beaters 10 and bars 18, 80 and thereby broken up and pulverized while said material is most easily frangible, the inclined surfaces of the blades 10 serving not only to break up the material but to move it longitudinally of the casing toward the outlet 11. During this operation the material is cooled by the water jacket 12 so that by the time it reaches the opening 11 it is not only fully pulverized but cooled sufficiently to permit convenient handling of the same.

In the form shown in Fig. 3, the material is fed to the hopper 24 in the same manner as above described regarding the hopper 4 and is broken up within the casing 19 when the latter is revolved, the same cooling operation taking place by virtue of the cooling jacket 27. It will be noted in this form that the cooling effect is limited to the part of the casing most distant from the furnace, as it may in some instances be desirable to first break up the material and subsequently cool the same.

We claim:—

The process of crushing and cooling roasted chemical products and ores which are easily frangible while hot but difficultly frangible when cold which comprises subjecting such material to crushing or disintegration while still in a highly heated condition and bringing such material while being crushed or disintegrated into contact with cooling means keeping the cooling medium free from direct contact with the material being treated.

In testimony whereof we have hereunto set our hands in the presence of two subscribing witnesses.

CARL DIETZ. [L. S.]
EMIL GOFFERJE. [L. S.]

Witnesses:
OTTO KÖNIG,
CHAS. J. WRIGHT.